Figure 1:
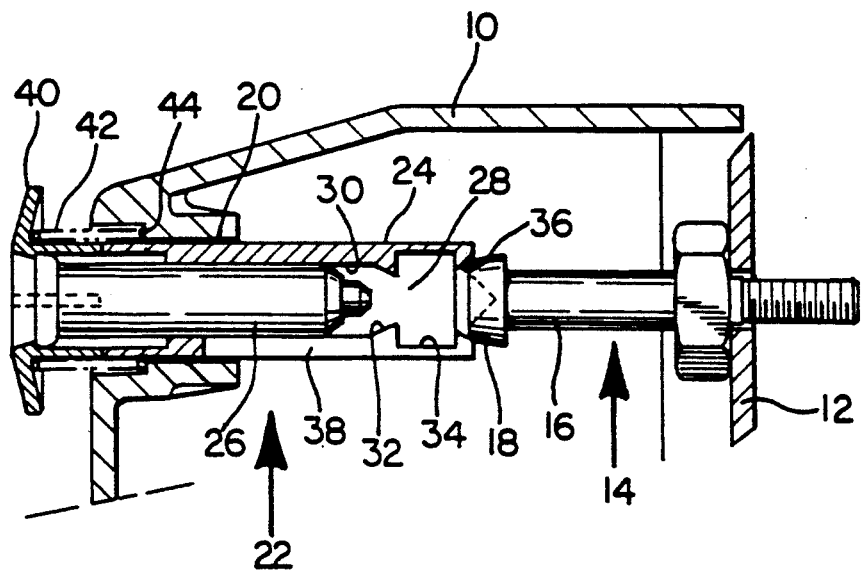

United States Patent [19]

Negre et al.

[11] Patent Number: 5,226,769
[45] Date of Patent: Jul. 13, 1993

[54] DEVICE FOR THE ASSEMBLY AND THE RAPID DISASSEMBLY OF TWO PARTS, ONE ON THE OTHER

[75] Inventors: Gilles Negre, Paris; Jean Fourcade, Las Lilas, both of France

[73] Assignee: Bendix Europe Services Techniques, Drancy, France

[21] Appl. No.: 934,056

[22] Filed: Aug. 21, 1992

[30] Foreign Application Priority Data

Sep. 30, 1991 [FR] France .................. 91 11984

[51] Int. Cl.⁵ .................. F16B 19/00; F16B 35/02
[52] U.S. Cl. .................. 411/354; 411/339; 411/383; 411/396; 403/407.1; 403/408.1
[58] Field of Search .......... 411/338, 339, 383, 384, 411/396, 354, 508–510, 512; 403/407.1, 408.1

[56] References Cited

U.S. PATENT DOCUMENTS 3,896,698  7/1975  Aylott .
4,671,718  6/1987  Eakin ............................. 403/408.1
4,929,135  5/1990  Delarue et al. .................. 411/354
5,108,133  4/1992  Malogerti ........................ 411/433
5,123,794  6/1992  Pire ............................. 411/383

FOREIGN PATENT DOCUMENTS 570222   4/1924  France .
1210943  3/1960  France .

Primary Examiner—Neill R. Wilson
Attorney, Agent, or Firm—Larry J. Palguta; Ken C. Decker

[57] ABSTRACT

The present invention relates to a device for the assembly and disassembly of a first pair (12) and of a second part (10), the first part (12) being securely attached to a first member (14) co-operating with a second member (22) retaining the second part (10) on the first (12). According to the invention, the first member (14) is a stud formed of a shank (16) and of a head (18) and the second member (22) is composed of a sleeve (24) in which slides a piston (26).

4 Claims, 2 Drawing Sheets

DEVICE FOR THE ASSEMBLY AND THE RAPID DISASSEMBLY OF TWO PARTS, ONE ON THE OTHER

The present invention has as its subject a device for the assembly and the rapid disassembly of two parts, one on the other.

In many fields of technology, it is often necessary to assemble two parts together in a secure manner, these two parts having to be capable of being assembled and disassembled in a rapid and secure manner a large number of times. The known screw-nut, split pin or key or circlip means, although capable of being used in a secure manner, do not however permit a rapid use.

The invention therefore has as its subject a device for assembly and for disassembly of two parts one on the other which is inexpensive and reliable, rapid and simple.

With this object, the invention provides a device for the assembly and the disassembly of a first part and of a second part, the first part being securely attached to a first member co-operating with a second member retaining the second part on the first, characterized in that the first member is a stud formed of a shank and of a head and in that the second member is composed of a sleeve in which slides a piston.

Figure 2:
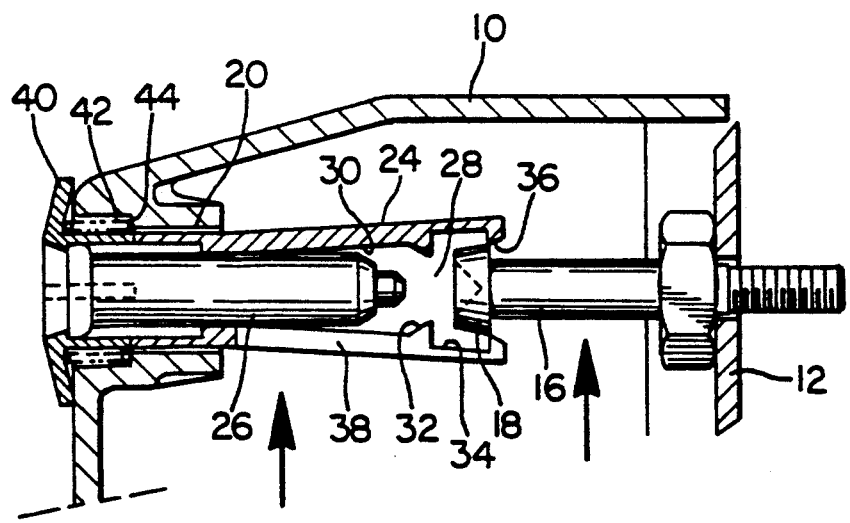
Figure 3:
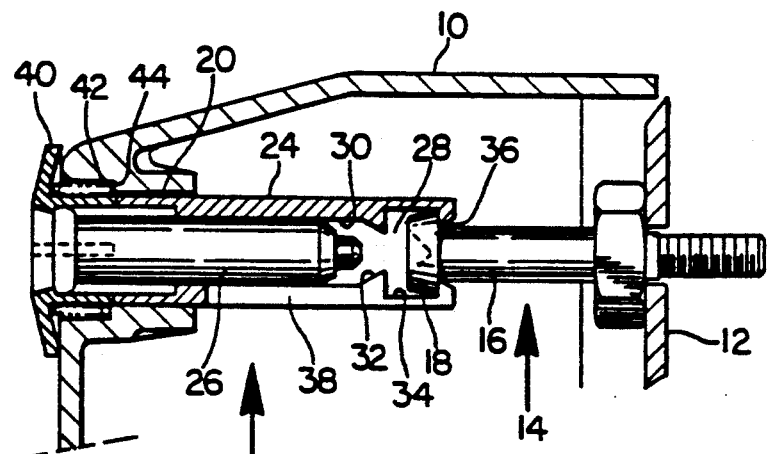
Figure 4:
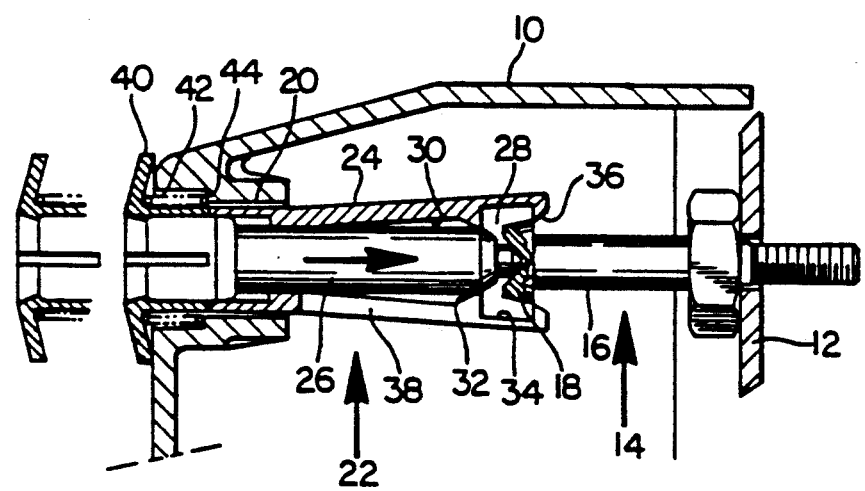
Figure 5:
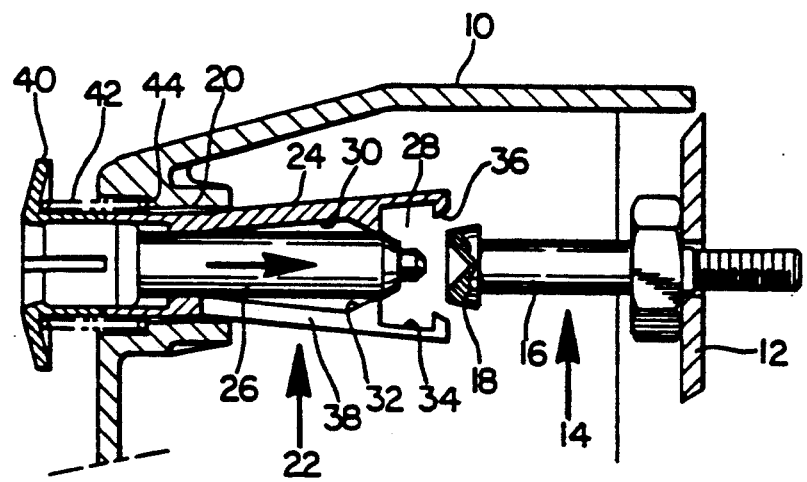

The invention will now be described by way of example with reference to the accompanying drawings in which:

FIG. 1 is a view in partial cross-section of an assembly device according to the present invention, shown in rest position, FIG. 2 is a view in partial cross-section of an assembly device according to the present invention, shown in the position which it occupies in the course of assembly, FIG. 3 is a view in partial cross-section of an assembly device according to the present invention, shown in its assembled position, FIG. 4 is a view in partial cross-section of an assembly device according to the present invention, shown in the position which it occupies in the course of disassembly, and FIG. 5 is a view in partial cross-section of an assembly device according to the present invention, shown in its disassembled position.

FIG. 1 shows an assembly device according to the invention, for the assembly of two parts one on the other, for example of a cover 10 on a support 12. To the support 12 is securely attached, for example by screwing and locking, a stud 14, constituted by a shank 16 and by a head 18. The head 18 has the shape of a truncated cone, whose small base is located on the outermost side of the stud 14.

In the cover 10 is formed an aperture 20 designed to come opposite the stud 14 when the cover 10 is in place on the support 12. In the aperture 20 is received a movable assembly 22, constituted by a sleeve 24 in which slides a piston 26.

The sleeve 24 of a tubular general shape, is formed with an internal bore 28 in which slides the piston 26. The bore 28 comprises a cylindrical portion 30 in the middle part of the sleeve 24, which connects with a portion 32 in the shape of a truncated cone towards the end of the sleeve 24 directed towards the stud 14, the small base of the truncated cone being the closer to the stud 14. This portion in the shape of a truncated cone opens into a groove 34 formed in the sleeve 24, of axial length slightly greater than the axial length of the head 18 of the stud 14. An aperture 36 is made at the end of the sleeve 24 so as to cause the groove 34 to open to the outside in the direction of the stud 14. This aperture 36 is advantageously in the shape of a truncated cone, having the same apex angle as the apex angle of the head 18 in the shape of a truncated cone of the stud 14, and whose large base is situated on the outer side and has a diameter equal to that of the small base of the head 18 in the shape of a truncated cone of the stud 14.

Lastly, radial slots 38 are made axially in the wall of the sleeve 24 so as to help its radial resilient deformation, and the sleeve is formed, at its end farthest from the stud 14 and designed to remain outside the cover, with a radially widened part forming a head 40.

The fixing device according to the invention having thus been described, its operation will easily be understood.

FIG. 1 shows the device of the invention ready to operate. The cover 10 having been correctly positioned beforehand with respect to the support 12 fitted with the stud 14, the aperture 20 in the cover 10 is located coaxial with the stud 14. The assembly 22, that is to say the sleeve 24 containing the piston 26 in the position shown, is then inserted into the aperture 20. A spring 42 will advantageously be disposed around the sleeve 24 beforehand, so as to come and bear against the face of the head 40 directed towards the cover 10 and against a shoulder 44 formed on the cover 10 around the aperture 20. The function of this spring will be explained later.

The insertion of the assembly 22 into the aperture 20 being continued, the sleeve 24 arrives in the position shown in FIG. 1, in which the circumference of the aperture 36 comes into contact with the circumference of the head 18 of the stud 14. The inner periphery of the aperture 36 and of the head 18 having complementary shapes, and owing to the slots 38, the edges of the aperture 36 will slide along the head 18 by separating radially, so as to arrive in the position shown in FIG. 2. During this movement, the spring 42 has been compressed.

At the end of this insertion movement, the head 18 is completely surrounded by the groove 34 and the edges of the aperture 36, owing to the resilience of the material constituting the sleeve 24, being capable of coming together so as to resume their rest position, as shown in FIG. 3. The cover 10 is then assembled to the support 12 in a particularly simple manner, namely the insertion alone of the assembly 22 into the aperture 20.

The disassembly of the cover and of the support is also effected in a very simple manner. As shown in FIG. 4, it is sufficient to push from the outside on one of the ends of the piston 26 with the aid of an appropriate tool, such as a screwdriver for example, for it to be displaced in the bore 28. The other end of the piston 26 then arrives in the portion 32 in the shape of a truncated cone of the bore 28 and causes the radial separation of the walls of the sleeve 24, and therefore also the radial separation of the edges of the aperture 36.

The latter will therefore increase in diameter in proportion as the piston 26 is driven in, until it becomes at least equal to the diameter of the large base of the head 18 of the stud 14. In concomitant manner, the end of the piston 26 comes to butt against the head 18 of the stud 14, in which is formed a concave conical imprint, of the same axis as that of the stud 14 and of the head 18. This conical imprint produces the centering of the piston 26 with respect to the stud 14, and therefore the centering of the edges of the aperture 36 in the sleeve 24 with respect to the head 18 of the stud 14. At this moment, the movement of the sleeve 24 towards the outside of the cover 10 is no longer prevented by the stud 14, and is on the contrary helped by the spring 42 which was in its compressed state.

The spring 42 therefore causes the sleeve 24 to come out of the cover 10, away from the stud 14, as shown in FIG. 4. The object of the spring 42 is to facilitate the disengagement of the sleeve 24 from the head 18. If it has been omitted during the assembly, deliberately or not, it would then be necessary to exert pressure on the piston 26 and traction on the sleeve 24 in order to disassemble the two parts.

By releasing the pressure on the piston 26, the action of the spring 42 becomes preponderant and the assembly 22 adopts the position shown in FIG. 5, where the separation of the two parts 10 and 12 is then possible.

As can also be seen in FIG. 5, the invention provides a major advantage. In fact, in this position where the sleeve 24 is disengaged from the head 18 under the action of the piston 26, the walls of the sleeve 24 have a flared shape. In moving back through the aperture 20, the sleeve 24 will therefore come to wedge in this aperture of the cover 10, thus rendering the assembly 22 captive.

When one wishes to proceed to the reassembly of the cover 10 on the support 12, one positions these two members correctly with respect to one another, and the device of the invention occupies the position shown in FIG. 5. By the exertion of pressure on the head 40 of the sleeve 24, the spring 42 is compressed as the sleeve 24—piston 26 assembly advances.

This assembly will come to butt, through the intermediary of the end of the piston 26, against the head 18 of the stud 14. The conical imprint which is formed in it produces as previously the centering of the piston 26, and of the edges of the aperture 36, with respect to the head 18 of the stud 14. Because of the forward position of the piston 26 in the sleeve 24, the aperture 36 has a diameter greater than that of the head 18, and the sleeve 24—piston 26 assembly will come to occupy the position shown in FIG. 4.

An additional pressure exerted on the head 40 of the sleeve 24, which then abuts against the cover 10, will result in a slight flexion of the latter so as to permit an additional advance of the sleeve 24. In the course of this additional movement, the edges of the aperture 36 pass beyond the head 18, and the portion 32 in the shape of a truncated cone of the bore 28 of the sleeve 24 slides along a region of the end of the piston 26 then abutted against the stud 14. By giving this end region of the piston 26 a suitable shape, for example that of a truncated cone as shown, the truncated-cone shapes of the sleeve 24 and of the piston 26 will cooperate so as to cause the backward movement of the piston 26 in the sleeve 24. Thus, the edges of the aperture 36 can resume their rest position by coming together radially, the head 18 of the stud 14 being again surrounded by the groove 34, and engaged with the sleeve 24.

We have then clearly described according to the invention a device which is particularly simple and rapid to use for the assembly, disassembly and subsequent reassembly of two parts one on the other, in an effective and inexpensive manner.

We claim:

1. A device for the assembly and disassembly of a first part and a second part, the first part being attached securely to a first member cooperating with a second member retaining the second part on the first part, the second member received in an aperture formed in the second part and the second member located opposite the first member when the second part is in place on the first part, the first member comprising a stud having a shank and a head with the shape of a truncated cone whose small base is located at an outermost side of the stud, the second member comprising a sleeve formed with an internal bore which comprises a cylindrical portion communicating with a frustoconical portion opening into a groove for receiving the head of the stud, and a piston sliding in the sleeve for disengaging the sleeve from the head of the stub.

2. The device according to claim 1, wherein axially extending radial slots are located in a wall of the sleeve.

3. The device according to claim 1, wherein the sleeve is formed at an end farthest from the stud with a radially enlarged part which forms a head.

4. The device according to claim 3, wherein a spring is disposed between the head of the sleeve and a shoulder formed on the second part around the aperture.

* * * * *